US006618972B2

(12) United States Patent
Bar-Yona

(10) Patent No.: US 6,618,972 B2
(45) Date of Patent: Sep. 16, 2003

(54) AUTOMATIC VENDING MACHINE

(75) Inventor: Itzchak Bar-Yona, Rosh Ha'Ayin (IL)

(73) Assignee: M.V.T. Multi Vision Technologies Ltd., Rosh Ha'Ayin (IL)

(*) Notice: Subject to any disclaimer, the term of this patent is extended or adjusted under 35 U.S.C. 154(b) by 87 days.

(21) Appl. No.: 09/785,198

(22) Filed: Feb. 20, 2001

(65) Prior Publication Data

US 2001/0018808 A1 Sep. 6, 2001

(30) Foreign Application Priority Data

Feb. 21, 2000 (IL) ........................................ 134650

(51) Int. Cl.[7] ........................................ G03B 25/02
(52) U.S. Cl. ........................................ 40/454; 40/437
(58) Field of Search ........................ 40/454, 564, 574, 40/437, 470

(56) References Cited

U.S. PATENT DOCUMENTS

| | | | | | |
|---|---|---|---|---|---|
| 3,562,941 | A | * | 2/1971 | Boden | 40/437 |
| 3,604,536 | A | | 9/1971 | Dinnerstein | |
| 3,613,277 | A | | 10/1971 | Rose et al. | |
| 3,660,919 | A | * | 5/1972 | Nagel | 40/437 |
| 3,686,781 | A | * | 8/1972 | Calhoun, Jr. | 40/437 |
| 3,742,631 | A | * | 7/1973 | Hasala | 40/437 |
| 3,811,213 | A | * | 5/1974 | Eaves | 40/437 |
| 4,034,555 | A | | 7/1977 | Rosenthal | |
| 4,067,129 | A | * | 1/1978 | Abramson et al. | 40/563 |
| 4,454,670 | A | * | 6/1984 | Bachmann et al. | 40/584 |
| 4,870,768 | A | * | 10/1989 | Watt et al. | 40/430 |
| 5,007,190 | A | | 4/1991 | Shyu | |
| 5,035,929 | A | * | 7/1991 | Myers et al. | 428/30 |

(List continued on next page.)

FOREIGN PATENT DOCUMENTS

| | | | | |
|---|---|---|---|---|
| CH | 131144 | | | 1/1929 |
| CH | 321586 | | | 5/1957 |
| CH | 337793 | | | 5/1959 |
| EP | 0 537 310 | | | 4/1993 |
| EP | 0 622 653 | | | 11/1994 |
| EP | 0 685 924 | | | 12/1995 |
| EP | 0 943 272 | | | 9/1999 |
| EP | 1 001 401 | | | 5/2000 |
| EP | 1 067 503 | | | 1/2001 |
| EP | 1 128 344 | | | 8/2001 |
| GB | 429042 | | | 5/1935 |
| JP | 2-54816 | | | 2/1990 |
| JP | 2-211437 | | | 8/1990 |
| JP | 7-334259 | | | 12/1995 |
| JP | 10134235 | A | * | 10/1996 |
| JP | 11066410 | A | * | 8/1997 |
| NL | 1013841 | | | 8/2001 |
| WO | WO 90/14782 | | | 12/1990 |
| WO | WO 95/30176 | | | 11/1995 |
| WO | WO 97/30436 | | | 8/1997 |

OTHER PUBLICATIONS

Patent Abstracts of Japan, JP 03–111887, May 13, 1991.
Patent Abstracts of Japan, JP 08–320659, Dec. 03, 1996.

*Primary Examiner*—William L. Miller
(74) *Attorney, Agent, or Firm*—Oblon, Spivak, McClelland, Maier & Neustadt, P.C.

(57) ABSTRACT

An automatic vending machine having a front door with at least one opening. A translucent image carrier bears two or more images cut into information strips and arranged on the image carrier by an intercalation process. The image carrier is mounted behind an array of cylindrical lenses. At least one light source is disposed behind the image carrier. A relative, linearly reciprocating movement is produced between the array of lenses and the image carrier in a direction perpendicular to an axial extent of the lenses. In the course of the relative movement, the array of cylindrical lenses provides, in succession enlarged views of the images borne by the image carrier, thereby producing an animated effect.

10 Claims, 8 Drawing Sheets

U.S. PATENT DOCUMENTS 5,237,766 A * 8/1993 Mikolay ...................... 40/564
5,270,636 A 12/1993 Lafferty
5,276,987 A 1/1994 Honse
5,416,997 A 5/1995 Dyment et al.
5,426,879 A * 6/1995 Hecker ........................ 40/427
5,488,451 A 1/1996 Goggins
5,494,445 A 2/1996 Sekiguchi et al.
5,513,458 A 5/1996 Dehli
5,586,089 A 12/1996 McGarvey
5,647,151 A 7/1997 Fantone et al.
5,706,142 A * 1/1998 Lee ............................ 359/819
5,720,123 A * 2/1998 Taylor ......................... 40/454
5,724,758 A * 3/1998 Gulick, Jr. ................... 40/454
5,760,572 A 6/1998 Takeda et al.
6,026,215 A 2/2000 Fantone et al.
6,076,293 A * 6/2000 Bergeron ..................... 40/503
6,078,424 A 6/2000 Morton
6,219,948 B1 4/2001 Bar-Yona
6,226,906 B1 5/2001 Bar-Yona
6,463,012 B1 10/2002 Bar-Yona

* cited by examiner

AUTOMATIC VENDING MACHINE

FIELD OF THE INVENTION

The present invention relates to an automatic vending machine which provides a dynamic display of its merchandise.

BACKGROUND OF THE INVENTION

Automatic vending machines are located in public places and offer a variety of merchandise such as hot and cold drinks, pastry, sweets, etc. Capturing the attention of passersby, that is, of potential customers, has a decisive effect on the sales volume of these machines. The operators of the machines therefore make every effort to catch the eye, e.g., by colorful graphic representations of their wares. Here, however, they must overcome the resistance developed, perhaps in self-defense, by the over-stimulated eyes of a public inundated with advertisements, posters, fliers, etc., and who is thus less and less attracted by static pictures. However, as research has shown, whenever advertisers realized that "motion sells" and switched from static to dynamic representation, sales increased by 10–15%.

DISCLOSURE OF THE INVENTION

It is thus one of the objects of the present invention to provide, at very little additional expense, an automatic vending machine that provides a dynamic, attractive display of the merchandise offered on its front face, is largely vandal-proof, and can be disposed in public places without a need to watch over it.

According to the invention, the above object is achieved by providing an automatic vending machine having a front door, comprising at least one window-like opening in said front door; a panel consisting of an array of cylindrical lenses located and fixedly mounted in said window-like opening; a translucent image carrier bearing a computer-processed image of at least one object to be shown in dynamic display, said image carrier being mounted behind said array of lenses; at least one light source disposed behind said image-carrying panel, and means for producing a relative, linearly reciprocating movement between said array of lenses and said image carrier in a direction perpendicular to the axial extent of said lenses; wherein, in the course of said relative movement, said array of cylindrical lenses provides a succession of compound, virtual, enlarged images, producing an animated effect.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of a first embodiment of the vending machine according to the present invention;

FIG. 2 is a cross-sectional view of the machine of FIG. 1;

FIG. 3 is an enlarged view of detail A of FIG. 2;

FIG. 4 is a cross-sectional view along plane IV—IV of FIG. 3;

FIG. 5 is a perspective view of the inside of the door of the embodiment of FIG. 1, with part of the door's rear wall and the image carrier partly removed;

FIG. 6 is a diagram relating to the problem of parallax;

FIG. 7 is a perspective view of a preferred embodiment of the invention;

FIG. 8 is a perspective view of the inside of the door of the embodiment of FIG. 7;

FIG. 9 is a partial, perspective view, at a larger scale, of the embodiment of FIG. 7;

FIG. 10 is an embodiment of a vending machine having a flat lens array and image carrier that are accessible without opening the vending machine's door;

FIG. 11 represents an embodiment with a combination of static and dynamic displays;

Figure 12:
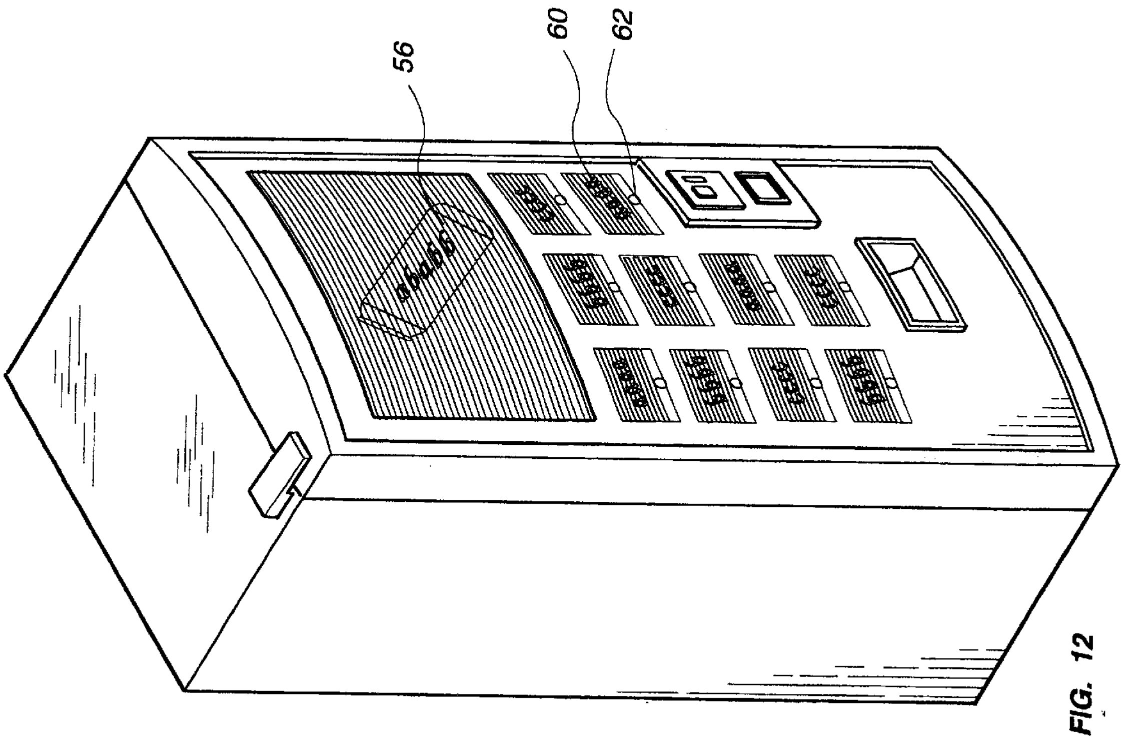
Figure 11:
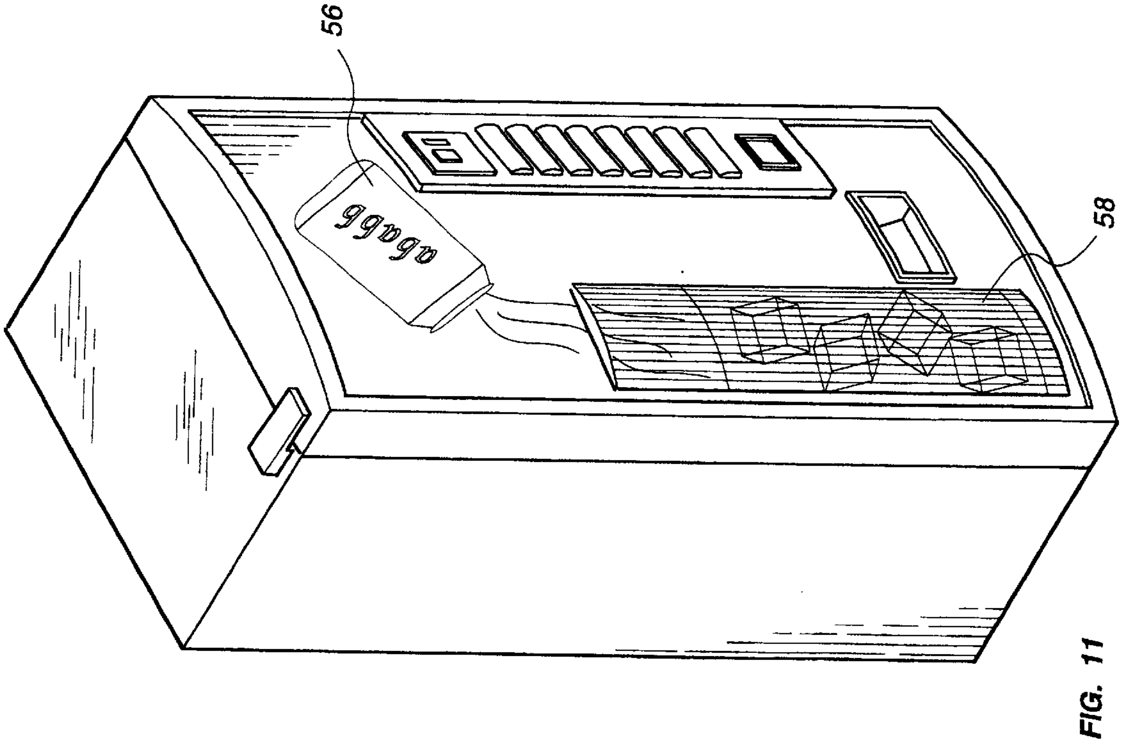
Figure 13:
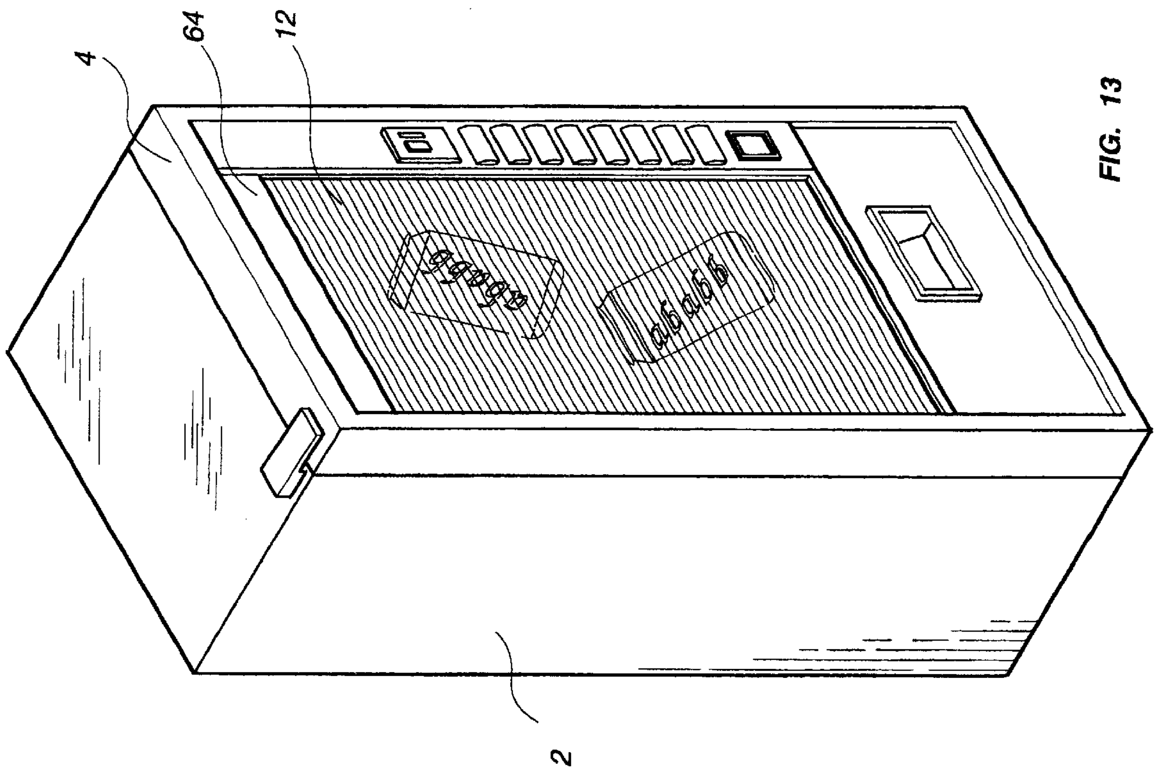
Figure 14:
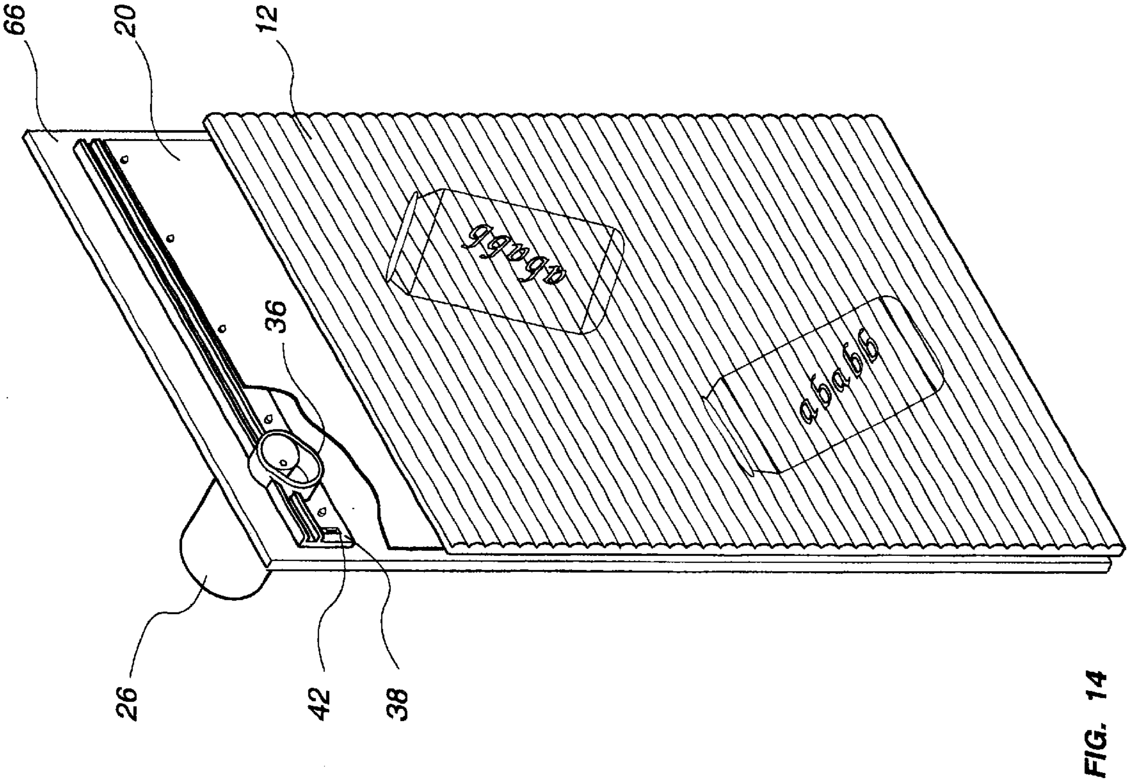
Figure 15:
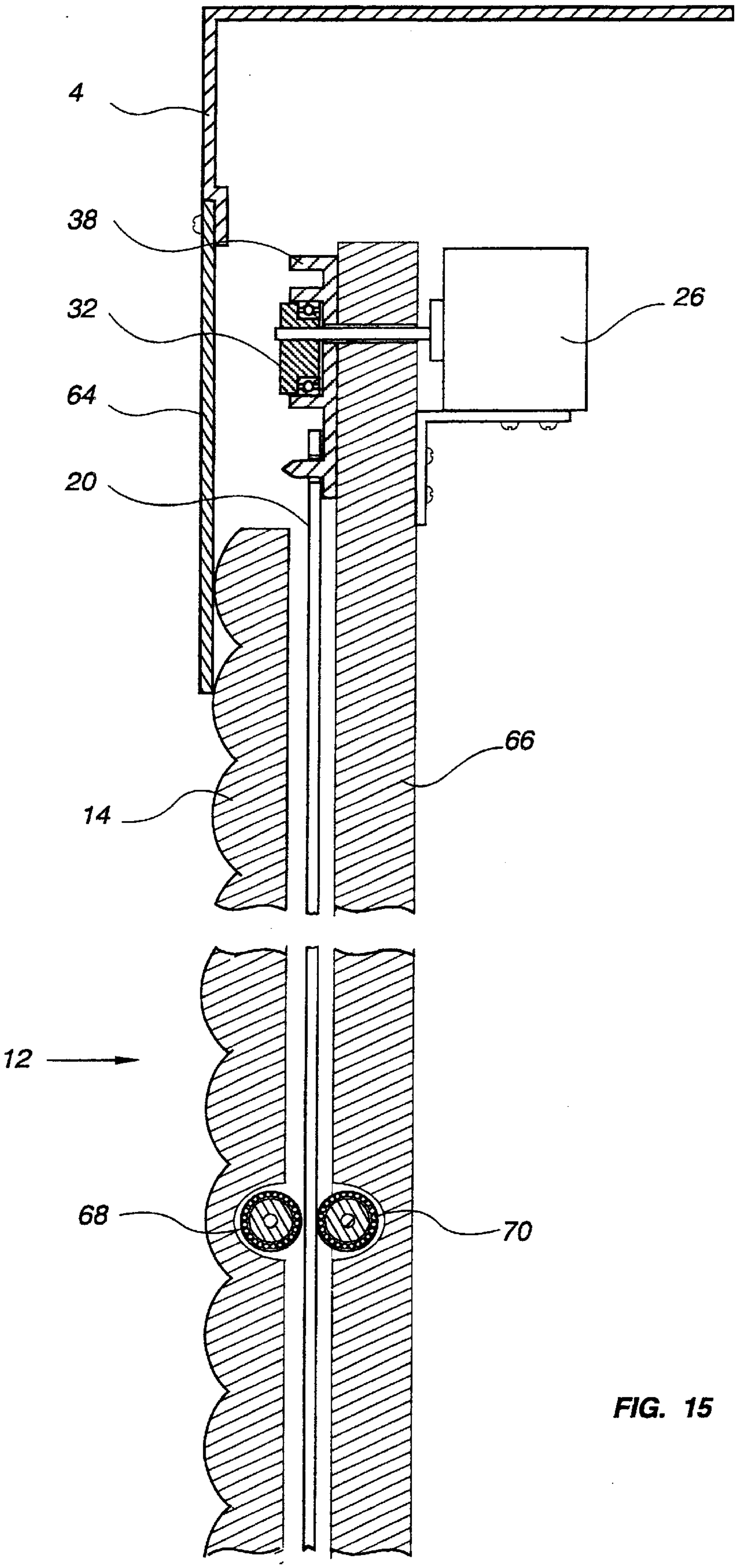

FIG. 12 shows an embodiment of the invention having a general display and a number of specific displays;

FIG. 13 is a perspective view of a further embodiment of the invention;

FIG. 14 is a perspective view of the lens array, image carrier and mechanism of the embodiment of FIG. 13, and FIG. 15 is a cross-sectional view of the mechanism of FIG. 11.

DETAILED DESCRIPTION

Figure 1:
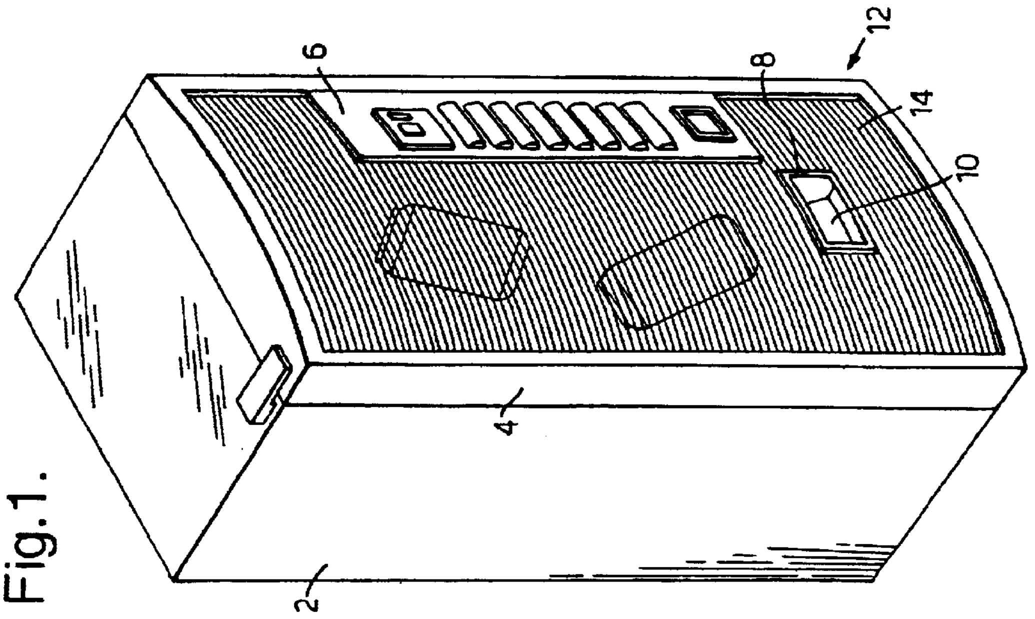

Referring now to the drawings, there is shown in FIG. 1 a first embodiment of the vending machine according to the present invention, comprising a housing 2, a door 4, a control panel 6 comprising the coin slots, coin tester mechanism, selector keys, coin return key, etc., all of which are per se known and will not be described here. Also shown is the outlet window 8 of a delivery chute 10.

The front face of door 4 consists of a convex panel constituted by a coherent array 12 formed of cylindrical lenses 14 extending in a horizontal direction. It is this lens array that, in a way to be explained further below, produces the above-mentioned dynamic display having an animated appearance.

Figure 2:
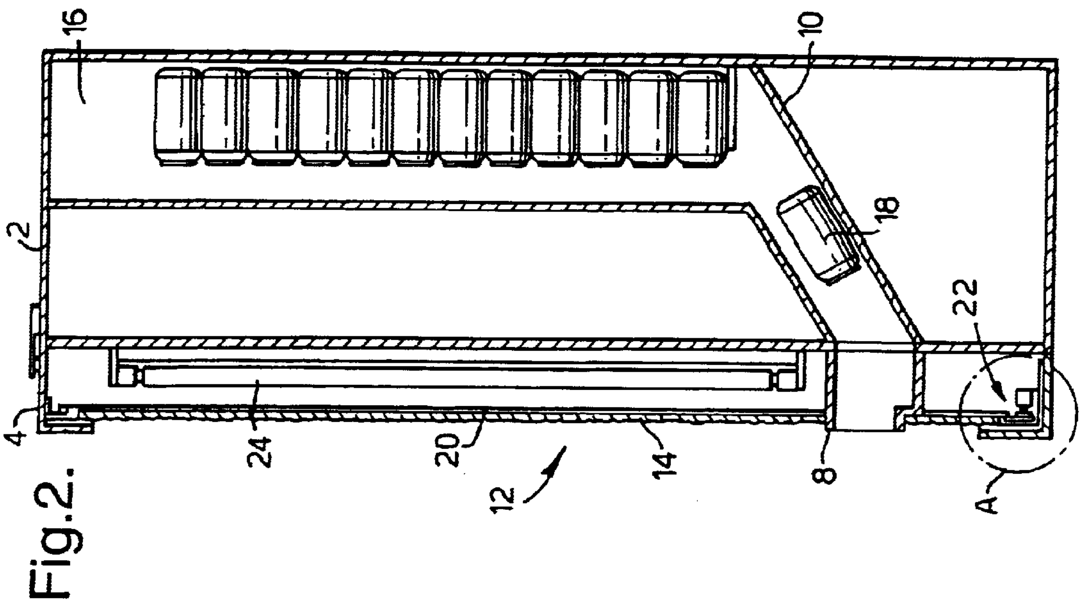
Figure 3:
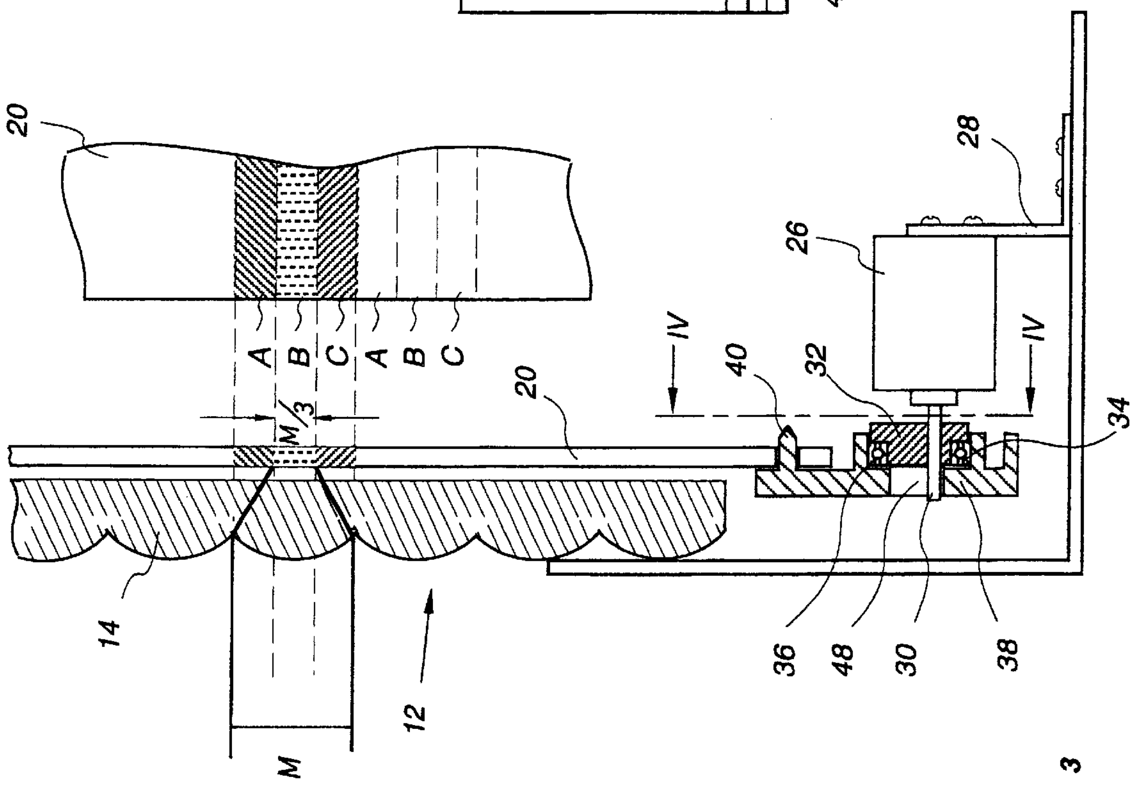

FIG. 2, a cross-sectional view of the vending machine of FIG. 1, shows outlet windows 8 and chute 10, the array 12 of lenses 14, compartments 16 storing the merchandise, in this case, soft drink cans 18, an image carrier 20 which can be either a film, a plastic panel, or the like, and the display mechanism 22, shown to better advantage in FIG. 3. Also shown is one of two or more fluorescent tubes 24 which serve as light sources.

Figure 4:
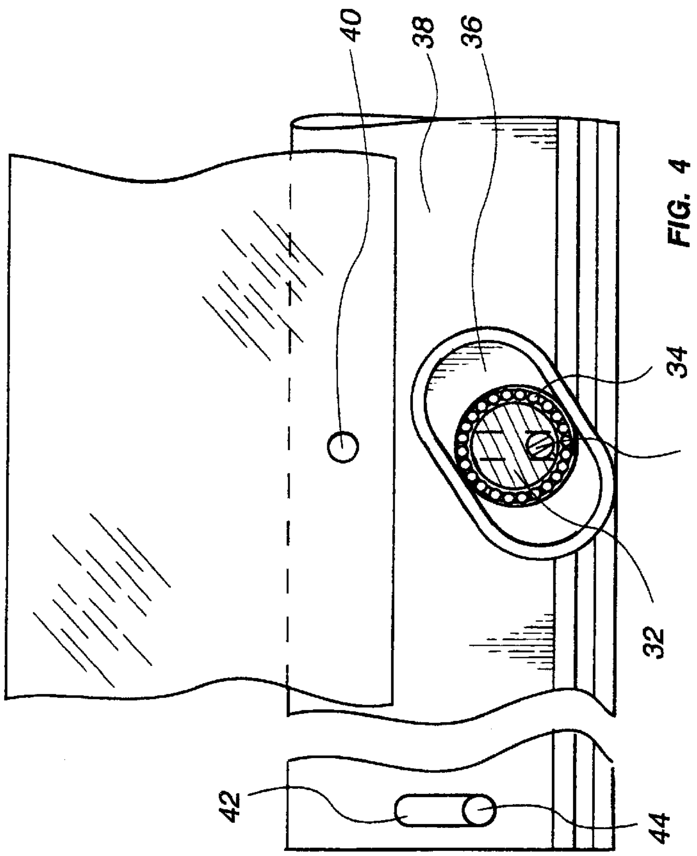

FIG. 3 is an enlargement of detail A of FIG. 2. Shown is an electric motor 26 mounted on a bracket 28 and having a shaft 30 carrying an eccentric 32. The active part of eccentric 32 is constituted by the outer race of a ball bearing 34 slidingly seated in an elongated recess 36 (seen to better effect in FIG. 4) that is part of a guide rail 38. Image carrier 20 is attached to guide rail 38 by means of a number of pins 40 (also see FIG. 5). The image carrier 20 can be easily replaced with a carrier bearing different images by lifting it off pins 40, thus detaching it from guide rail 38.

When motor 26 rotates, eccentric 32 obviously rotates as well and, via ball bearing 34, whose only function is to reduce friction, causes guide rail 38 to move vertically upwards and downwards. The total stroke of image carrier 20 equals the dimension M of a cylindrical lens 14, as shown in FIG. 3.

Guide rail 38 is constrained by two symmetrically positioned guide slots 42 (only one of which is shown) and two pins 44, to move only in a straight vertical line. The proper distance of image carrier 20 from lens array 12 is maintained with the aid of U-shaped guide profiles 46 (FIG. 5) arranged on both lateral edges of image carrier 20 and fixedly attached to elements of door 4. Also shown in FIG. 3 is a vertical slot 48 in guide rail 38, which permits rail 38 to move vertically relative to shaft 30, but supports it against lateral forces.

While from the purely mechanical point of view, the ideal orientation of the elongated recess 36 would be horizontal, this would result in a substantial reduction of the speed of movement of image carrier 20 towards its extreme positions, which would seriously interfere with the desired animation effect imparted to the display. The slant of elongated recess 36, seen in FIG. 4, enhances the uniformity of that speed, thereby promoting the animation effect. For the sake of simplicity, the curved shape of guide rail 39 has been disregarded in FIG. 4.

Figure 5:
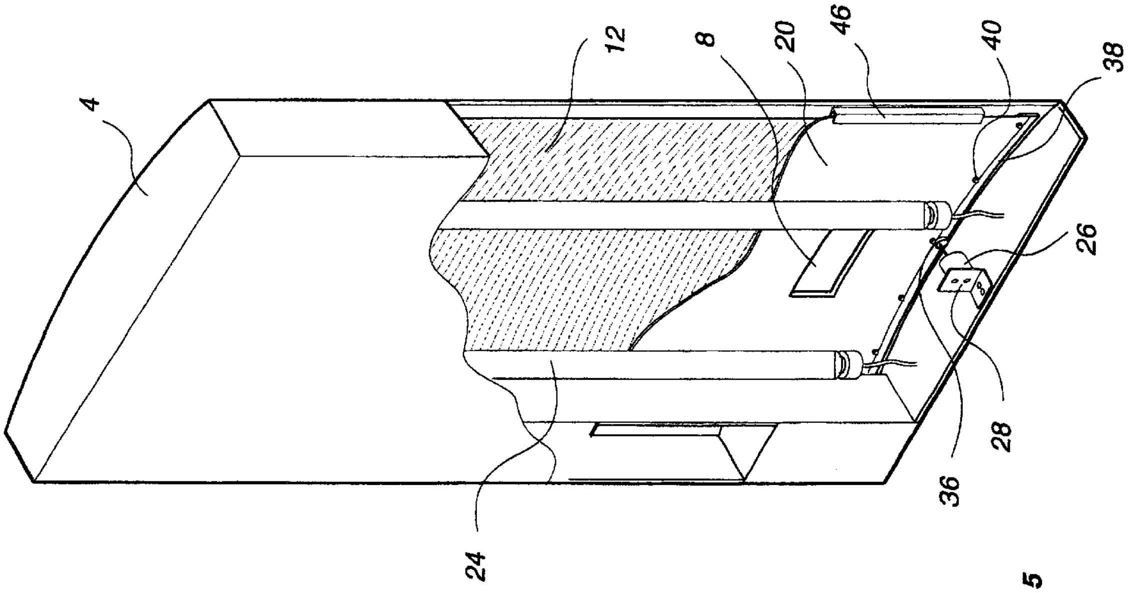

FIG. 5 illustrates the inside of door 4 of the embodiment of FIG. 1, clearly indicating the curved shapes of lens array 12, image carrier 20 and guide rail 38. Also shown is part of guide profile 46.

The basics of the dynamic display will now be briefly explained with reference to the upper portion of FIG. 3. Using a computer program, images of three objects A, B, C, or of one object in three different stages of movement, are cut into information strips, each strip of a width W=M/3, where M is the modular distance between adjacent lenses 14. By a process of intercalation, these information strips are then arranged in successive groups A, B, C, A, B, C . . . and applied to image carrier 20. In the stage shown in FIG. 3, all information strips B are located exactly opposite lenses 14 of array 12. Given the optics of the arrangement, strips B will be magnified and, as seen by an observer, will completely fill all lenses 14, in their totality representing object B. Moving image carrier 20 upwards will reveal object C, all lenses 14 now being filled with the enlarged images of strips C. Continuing to move image carrier 20 further upwards will fill all of the lenses with the enlarged images of strips A, revealing object A.

A problem that needs addressing is the problem of parallax. As long as displays are of postcard size, one may assume that they are viewed in a direction which is substantially perpendicular to the plane of the image carrier and that the problem of parallax does not, therefore, arise. However, with displays of a height larger than 40 cm, parallax is already felt.

Figure 6:
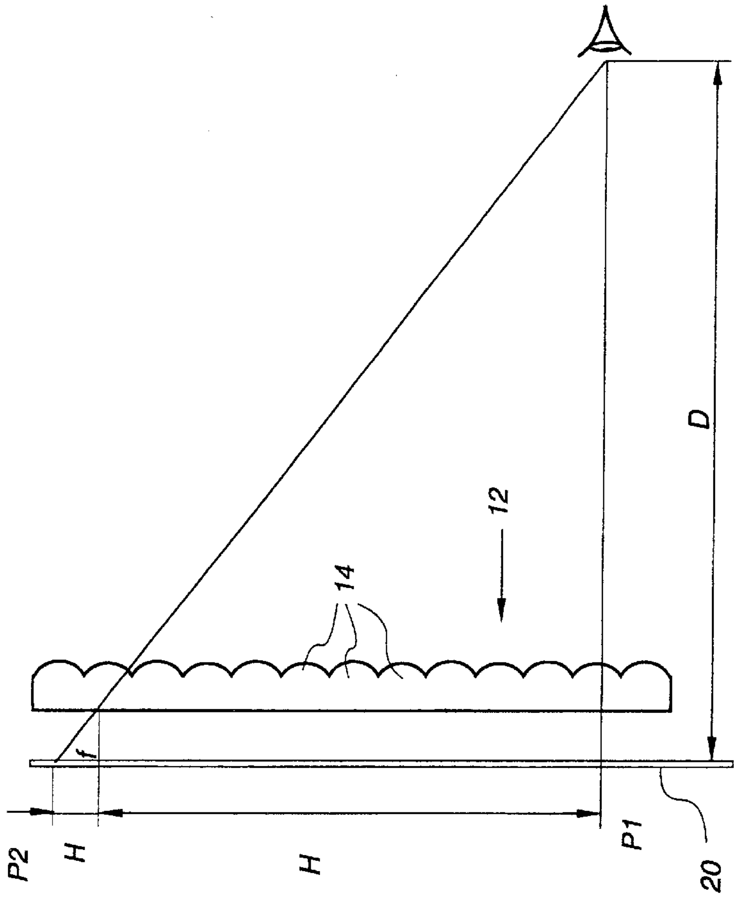

In order to better explain, reference is now made to FIG. 6, which represents a display device having an array of lenses 12 and an image carrier 20 carrying three images, similar to the schematic drawing of FIG. 3. The eye of an observer is located at a distance D from image carrier 20 and looks at point $P_1$ of a given image, e.g., that of strip A, in a direction substantially perpendicular to the device. However, the higher the observer raises his eyes, or the more he lowers his eyes, the more is what he sees affected by parallax; in other words, the more the observer is likely to see strips of a different basic image, e.g., the images of strip B or strip C. If the distance from carrier 20 to the rear surface of the lens array is f; and the height of carrier 20 after the intercalation step is 20 (assuming that the center of image carrier 20 is at eye level), the parallactic shift is $$\Delta H = \frac{fH}{D-f}.$$

As f is mostly rather small relative to the distance D, it can be neglected, resulting in a definitely useful approximation $$\Delta H = \frac{fH}{D}.$$

A second permissible approximation is based on the assumption that the parallactic shift increases linearly from point $P_1$ to point $P_2$, while strictly speaking, this shift is a trigonometric function of the angle included between the ray from a given lens 14 to the observer's eye, and the horizontal. However, even for the uppermost point $P_2$, this angle rarely exceeds 15°, at which magnitude the tangent curve still approximates a straight line.

Feeding the computer the numerical values of distances D and f as well as H, ΔH for H=50 cm, D=200 cm and f=8 cm, is computed as $$\frac{50 \times 8}{200} = 2 \text{ cm}.$$

The stretching required to turn H into H+ΔH, is then computed as $$\frac{\Delta H + H}{H} = 1.04,$$

that is, for the entire height 2H, a stretch of 8%, to be carried out by the computer program.

A preferred embodiment of the present invention is represented in FIGS. 7–10. The distinctive features of this embodiment are three: (1) the cylindrical lenses 14 extend in the vertical, rather than in the horizontal, direction; (2) as seen from the outside, the lens array 12, as well as the image carrier 20, are concave rather than convex, and (3) the image carrier 20 is in direct contact with the rear surface of lens array 12, rather than a small, predetermined distance away.

Figure 8:
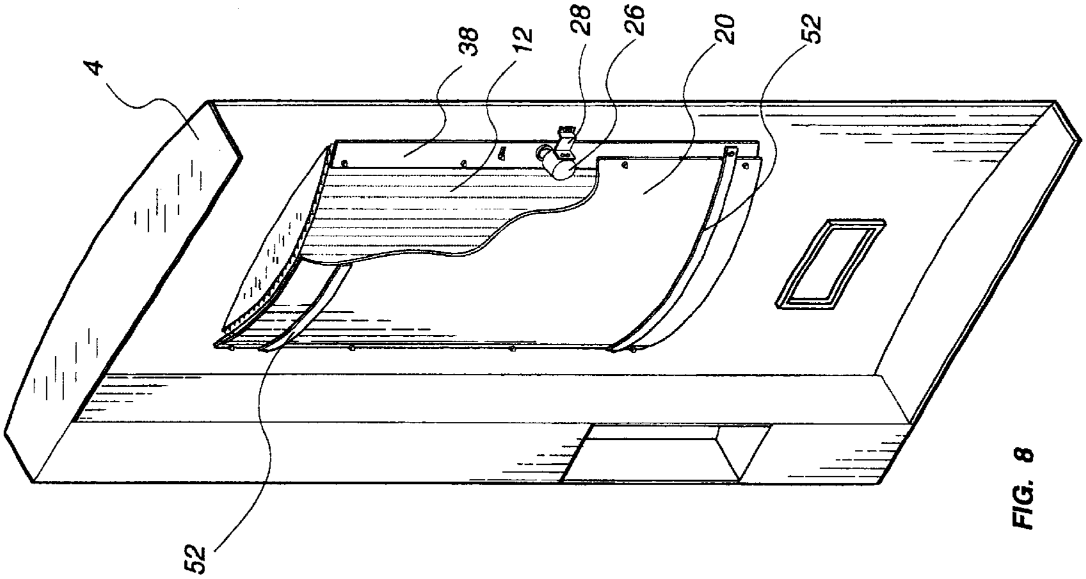
Figure 7:
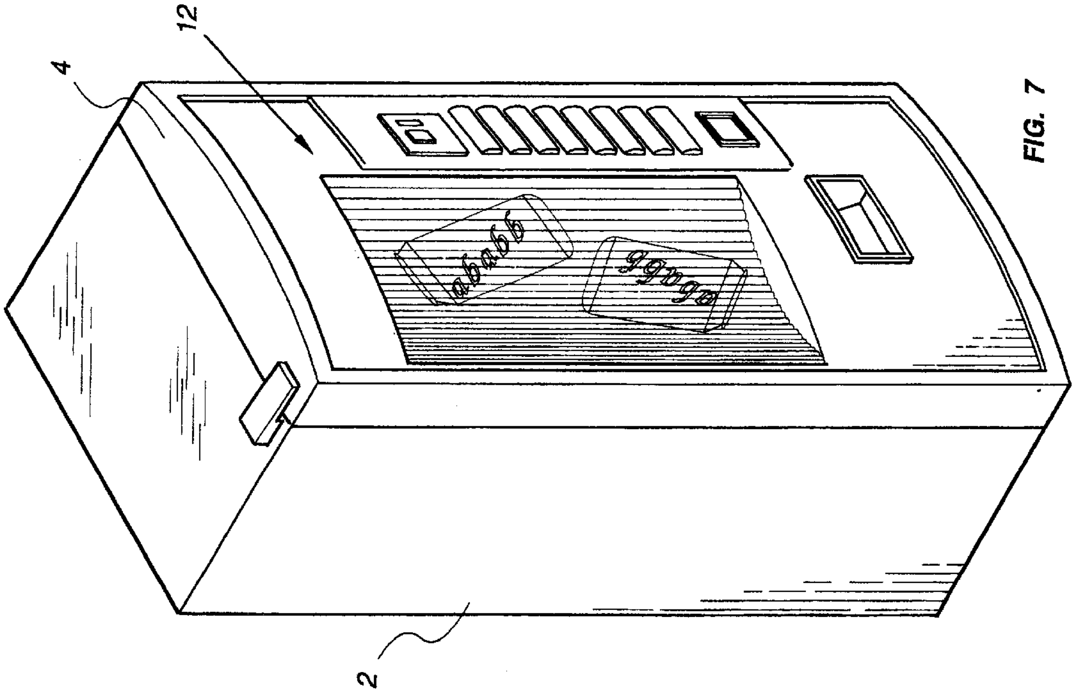

FIG. 8 shows the inside of door 4 of the embodiment of FIG. 7. Apart from lens array 12 and image carrier 20, there are shown electric motor 26 in its bracket 28, as well as one of two guide rails 38, the second rail on the left being partly hidden by the curvature of image carrier 20. These details are seen to better advantage and at a larger scale in FIG. 9, which also shows elongated recess 36, guide slots 42 and pins 44. Motor bracket 28 is mounted by means of screws on part 50 of the door body.

Figure 9:
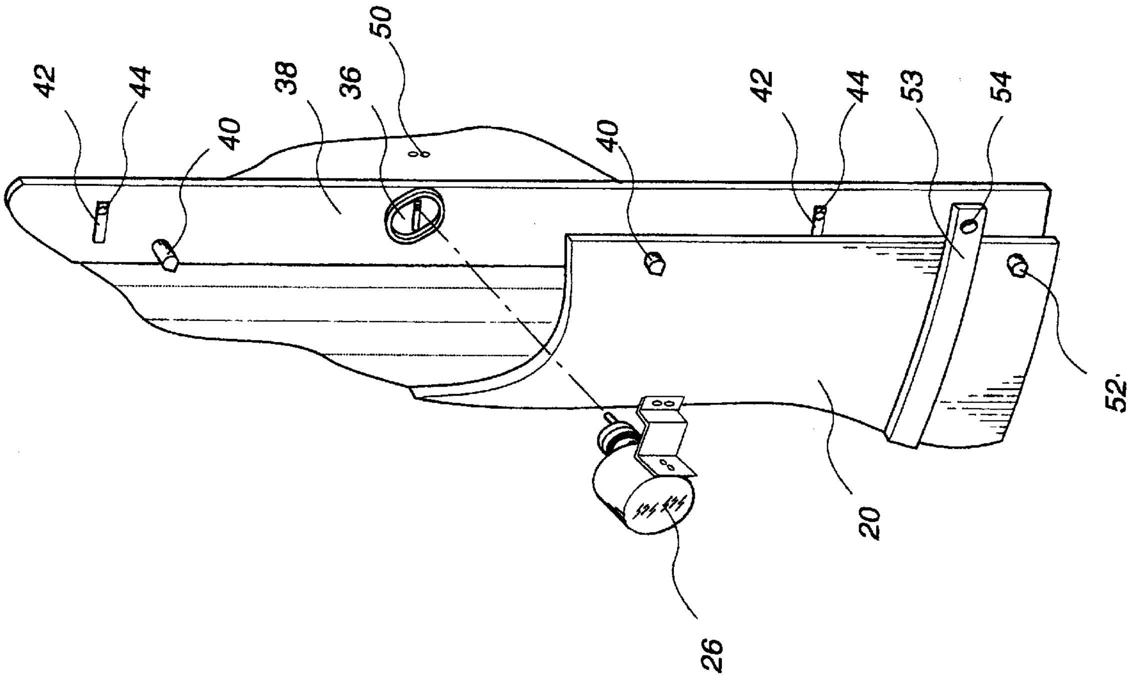

As mentioned above, in the embodiment of FIG. 7 the image carrier 20 is in direct contact with the rear side of lens array 12. Provision is therefore made for elements that are connected to guide rails 38 and, by spreading them apart, pull image carrier 20 tightly against the curved rear of lens array 12. This is achieved by means of two flat springs 52 (FIG. 8), of which only the lower one is seen in FIG. 9.

Figure 10:
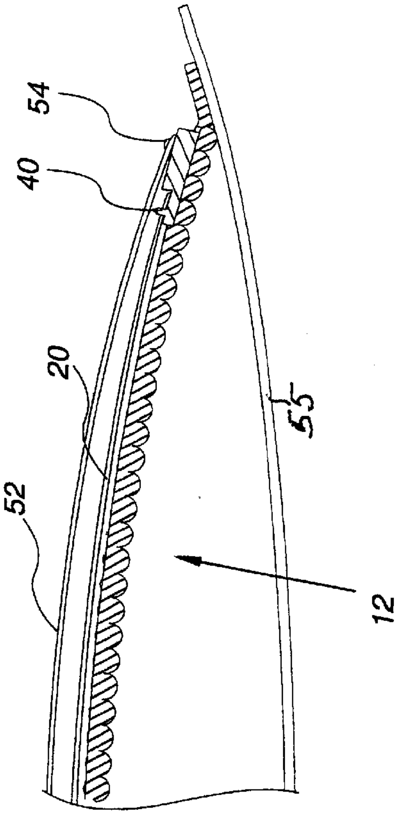

The effect of springs 52 is best understood from FIG. 10. Springs 52 have holes 53 at both of their ends, which holes fit over pins 54 that are fixedly attached to guide rails 54. The distance between holes 53 is larger than the peripheral distance between pins 54, and thus, in order to attach both ends of each spring 52 to its respective pins 54, the spring must be elastically flexed to assume a curvature larger than that of image carrier 20, until both holes 53 will slip over pins 54. The required elastic deformation provides the spreading force required to ensure good contact. FIG. 10 clearly shows that the curvature of spring 52 is larger than that of image carrier 20. Also shown is a window-like, transparent cover portion 55 which serves to protect the lens array against vandalism.

FIG. 11 represents an embodiment having both a static display 56 showing a can pouring out a drink, and a dynamic display 58 showing ice cubes bobbing up and down.

FIG. 12 represents a further embodiment having a general display representing a soft-drink can 56 and a number of specific, small displays 60 showing different types of soft drinks, each small display also including a push-button 62 for ordering a specific drink.

The embodiment of FIG. 13 has a flat lens array 12 and a removable cover plate 64, facilitating access to the display for maintenance and replacement of image carriers, without the need to open door 4. This is of importance in cases where the front of the vending machine is to be rented out to a firm not directly connected to its owners.

FIG. 14 represents the lens array 12, image carrier 20 and mechanism of the display unit of FIG. 13. Also shown are electric motor 26, guide rail 38, elongated recess 36, eccentric 32, all of which are known from FIG. 3. The mechanism is mounted on a panel 66. The position of image carrier 20 relative to lens array 12 is maintained by two small ball bearings 68 mounted on shafts 70 in grooves 72 passing along lens array 12 and panel 66.

While in all embodiments referred to, the relative motion required between lens array 12 and image carrier 20 is produced by moving the latter, the same effect could obviously be attained also by moving the lens array 12.

It will be evident to those skilled in the art that the invention is not limited to the details of the foregoing illustrated embodiments and that the present invention may be embodied in other specific forms without departing from the spirit or essential attributes thereof The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic vending machine having a front door, comprising;

at least one opening in said front door;

a translucent image carrier, bearing two or more images cut into information strips and arranged on said image carrier by an intercalation process, said image carrier being mounted behind an array of cylindrical lenses;

at least one light source disposed behind said image carrier; and means for producing a relative, linearly reciprocating movement between said array of lenses and said image carrier in a direction perpendicular to an axial extent of said lenses;

wherein, in the course of said relative movement, said array of cylindrical lenses provides, in succession enlarged views of the images borne by said image carrier, thereby producing an animal animated effect.

2. The vending machine as claimed in claim 1, wherein the means for imparting a linearly reciprocating movement comprises an electric motor fixedly mounted inside the door, said motor having a shaft carrying an eccentric, wherein the active part of said eccentric is seated in an elongated recess in a guide rail to which the image carrier is attached, thereby causing linear motion of said image carrier when said shaft of said motor rotates.

3. The vending machine as claimed in claim 2, wherein the rise of the eccentric equals the distance between two adjacent cylindrical lenses of the lens array.

4. The vending machine as claimed in claim 2 wherein the guide rail is provided with guide means restricting the movement of said guide rail to a linear movement in a direction substantially perpendicular to the axial of said cylindrical lenses.

5. The vending machine as claimed in claim 1, wherein, in order to reduce parallax apt to be produced by close-distance, wide-angle viewing, the height H of the images on said image carrier is stretched by a length AH beyond the height H of the point of incidence of the extreme viewing angle by an amount being a function of the viewing distance of said height H and of the focal length of the lenses of said lens array.

6. The vending machine as claimed in claim 1, wherein said panel of cylindrical lenses is convex, as seen from the outside.

7. The vending machine as claimed in claim 1, wherein said panel of cylindrical lenses is concave, as seen from the outside.

8. The vending machine as claimed in claim 1, wherein said panel of cylindrical lenses is substantially planar.

9. The vending machine as claimed in claim 1, wherein the cylindrical lenses of said array extend in a substantially horizontal direction.

10. The vending machine as claimed in claim 1, wherein the cylindrical lenses of said array extend in a substantially vertical direction.

* * * * *